July 16, 1940.   C. JOLAS ET AL   2,208,263
INDICATING DEVICE
Filed Feb. 13, 1939
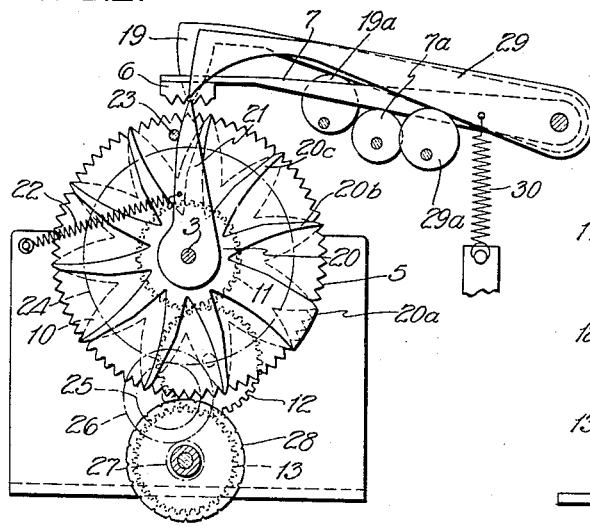
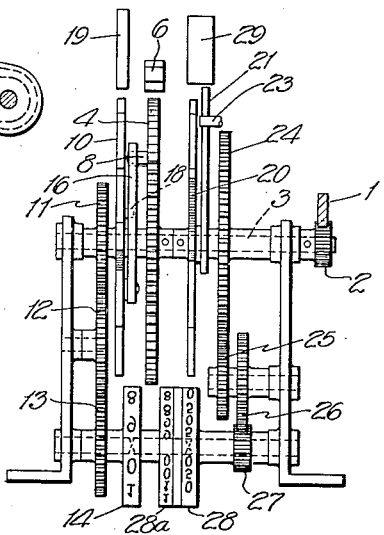
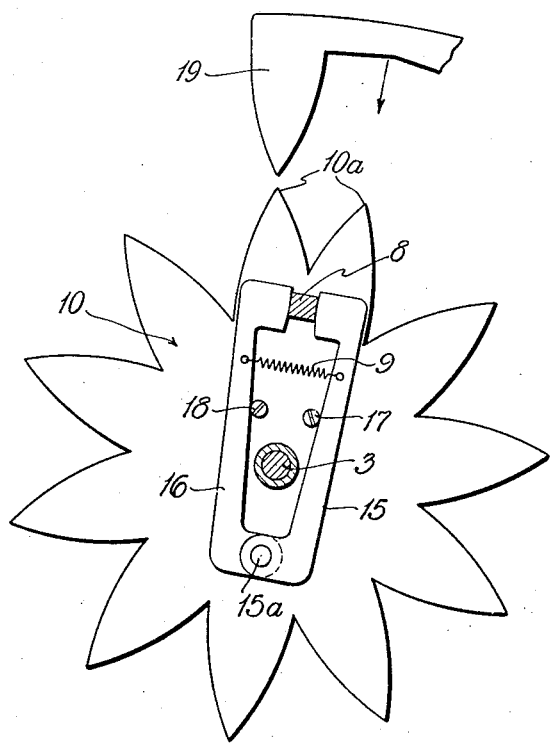
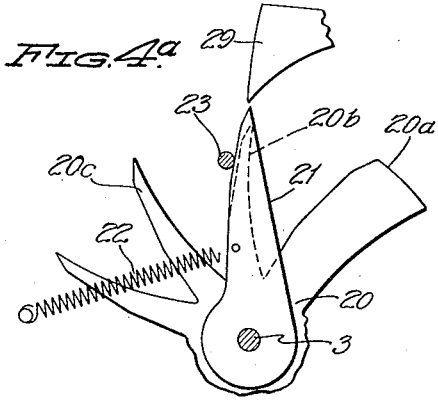
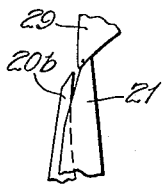
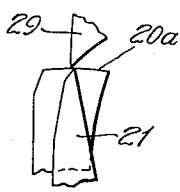
INVENTORS
Carl Jolas and Willi Stein
BY
ATTORNEYS Patented July 16, 1940

2,208,263

UNITED STATES PATENT OFFICE 2,208,263

INDICATING DEVICE

Carl Jolas, Darmstadt, and Willi Stein, Frankfort-on-the-Main, Germany, assignors to Carl Schenck Eisengiesserei u. Maschinenfabrik Darmstadt, G. m. b. H., Darmstadt, Germany, a corporation of Germany Application February 13, 1939, Serial No. 256,179
In Germany February 18, 1938

5 Claims. (Cl. 235—1)

This invention relates to an indicating mechanism involving counting wheels or similar elements, in particular for automatic scales, in which the value representing the response of the device is transferred by an adjusting mechanism to the counting mechanism, at which it can either be directly observed by the operator or by which it can be printed.

In the present application the invention is shown embodied in an automatic scale, though it is obvious that it might be embodied in devices other than scales.

In indicating and counting mechanisms, especially for scales, the result must be indicated with an exactness commensurate with the order of the scale tolerance which appears on the ordinary visible dial of the scale. In order to operate a number of counting wheels, one for each digit of the resulting figure, it was necessary heretofore to employ a comparatively high gearing between the scale mechanism and the numeral-indicating or printing wheels for the values of the lowest decimal digits, because it is necessary to very rapidly set the wheels to the position indicating the result. During the adjusting period this necessitates the type wheels running at very high speeds. Thereby the exactness, as well as the life of the mechanism, is seriously impaired. Besides, owing to the high speed of the type wheels and their operating elements, comparatively large dynamic forces are created which result in a comparatively large momentum of the operating parts, so that when they are stopped suddenly at the desired point, the material is subject to great stresses and overrunning is difficult to avoid. Errors in the printed or indicated result are introduced, especially by the likely overrunning of the type wheels, which can be avoided in the present-day mechanism only by taking the overrunning into consideration in the construction and operation of the wheels. Such errors, however, cannot be entirely eliminated, because the speed of the type wheels depends on a number of uncertain contributing factors, among others the varying loads to be weighed. Lastly, through high gearing, backlash in the intermediate gear wheels is difficult to avoid and is likely to increase owing to the great stresses to which such mechanisms are subject.

Various attempts have been made to remove the foregoing difficulties. For instance, adjusting devices for type wheels are known in which the speed of the wheels is slowed down before they reach their final indicating position, so that the counting mechanism can be stopped to indicate exactly the response of the scale without imparting stresses to the counting mechanism. This, however, does not remove the disadvantages of high gearing, and besides renders the entire mechanism very complicated. In other counting and printing mechanisms of this character, only a part of the result is transmitted to the counting mechanism, whereas the units in the larger value digits are indicated separately and in a different manner. It is true that this shortens the running time for the type wheels, but the detrimental influence of the dynamic forces is not removed in this type of mechanism.

According to the present invention, the speed ratio between the elements of the actual weighing device and those which operate the type wheels is increased only sufficiently to permit the type wheel mechanism to be positioned with certainty for the smallest numerical value to be indicated by the type wheels or to be printed. Accordingly, the speed of the indicating element for the smallest decimal value becomes smaller than is necessary in the devices heretofore suggested in the art. Therefore, the gearing between the weighing device proper and the first indicator drive gear may be maintained comparatively low, and thereby the dynamic forces and thus the forces required for stopping the wheels are considerably reduced. As a consequence, the wear and tear on these parts is considerably reduced, and thus their life is extended, while on the other hand the final value is indicated with much greater exactness.

Starting from the moving element which is directly connected with the weighing mechanism, and which for the present purpose constitutes the prime mover for the indicating mechanism, the result of the weighing is transmitted separately to the different type wheels or to different groups of type wheels, according to their decimal position in the result. Each type wheel thereby traverses the range of the digit in which it is positioned only once, that is to say, each type wheel makes only one revolution so that the speed of each wheel is comparatively low and yet a quick adjustment of the entire indicating and counting mechanism becomes possible.

In the drawing a practical form of the invention is illustrated. In this drawing—

Fig. 1 represents a face view of a numeral-indicating mechanism—which can be used as a printing mechanism if desired—together with the appertaining elements by which the type wheels are moved and set for the final result.

Fig. 2 represents a side elevation of the device, Fig. 1.

Fig. 3 represents in larger scale the toothed disc which serves for positioning the higher value decimal digit, and Figs. 4a, 4b, and 4c show the device for positioning the lower value decimal digits in three different operating positions.

The motion of the scale, for instance the throw of a pendulum indicator (not shown here), is either directly or indirectly transmitted by means of the rack bar 1 to the pinion 2 (Fig. 2) fixed on an arbor 3. On this arbor are also fixed the serrated disc 4 and toothed disc 20 so that both rotate together with pinion 2. Disc 4 is provided with fine serrations 5 and cooperates with a positioning pawl 6, also provided with fine teeth and mounted on a lever arm 7 which, owing to its small throw, moves pawl element 6 practically in radial direction toward and away from disc 4. By means of serrated pawl element 6, disc 4 can be set in given positions when lever 7 is depressed. That is to say, when the pawl element 6 descends onto teeth 5, disc 4 is turned slightly in one or the other direction until the teeth of the pawl and of the disc properly come into mesh. Since disc 4 is fixed on arbor 3, together with disc 20, the latter also becomes set in the same given position. Disc 20 cooperates with a positioning pawl 29 and a sub-unit setting pawl 21. Positioning pawl 29 as well as lever 7 in Fig. 1 are individually spring-controlled tending to engage their respective discs (see, for instance, spring 30 of pawl 29) and are controlled by means of cams 29a and 7a respectively which normally hold the pawls from the wheels, but when operated permit the engagement of the pawls with their appertaining discs. This occurs as soon as the weighing operation is completed. As will be noted from Fig. 4a, the toothed disc 20 has comparatively thin, elongated teeth equal in number to the number of digit units contained on higher decimal place numeral wheel 14. Sub-unit setting pawl 21 is loosely mounted on arbor 3 and normally held against a fixed stop 23 by means of a spring 22. To pawl 21 is attached a gear wheel 24 which, by means of a train of gears 25, 26, drives the numeral discs 28, 28a, which are fixed together and contain together a division of one unit of wheel 14 into twenty steps, each step representing five sub-units of the units of wheel 14 (5—95). Thus when pawl 21 has traversed, for instance in Fig. 4c, the angular distance between the two teeth 20b, 20a of disc 20, numeral wheels 28, 28a have made one revolution. In other words, assuming wheel 14 has marked on it as units the tenth values of the total range to be weighed, wheels 28a and 28 respectively indicate together for each division or step one twentieth (0.05) of each unit value of wheel 14, in other words 0.005 of the range of wheel 14.

Positioning pawl 29, as will be noted from Fig. 2, is wide enough to cover the path of the teeth of disc 20 as well as that of the sub-unit setting pawl 21. If now, for instance by the descent of positioning pawl 6 through strong spring power, discs 4 and 20 have been set in the position which they have assumed during the weighing operation, for instance so that disc 20 is in a position with its teeth relative to sub-unit setting pawl 21 as shown in Fig. 4a, and if now the positioning pawl 29 is released by its cam and descends under strong spring power, it will engage pawl 21 and move the latter clockwise until the positioning pawl 29 engages the tooth 20b of disc 20 then in its path. In that case, as appears from Fig. 4a, this would cause the clockwise rotation of pawl 21 only for a very short distance, because pawl 29 would soon engage the tooth 20b of disc 20 shown in dotted lines. Therefore, the gear train 24, 25, 26 would move the numeral wheels 28, 28a only a very small distance, say for instance 0.005 weighing units. If the load being weighed should have moved the teeth of disc 20, for instance, so that when disc 20 is set in final position subunit setting pawl 21 would become located midway between two teeth, and positioning pawl 29 descends, pawl 21 would be moved clockwise half the angular distance between two teeth of disc 20 until pawl 29 strikes the next tooth of disc 20 in clockwise direction and therefore moves the numeral wheels 28, 28a about ½ revolution and accordingly to show in the present example about 0.055 weighing units. In Fig. 4b is shown a relative position between pawl 21 and one of the teeth of disc 20, in which, on the descent of pawl 29, pawl 21 is moved almost the entire angular distance between two teeth of disc 20, which might in the present example indicate 0.095 weighing units. As soon as the weighing operation is finished, the pawl-lifting cams are brought into action again and lever 7 and pawl 29 are lifted off their respective discs so that adjusting pawl 21 is pulled back by spring 22 against stop 23, and the type wheels 28, 28a are returned to their normal or no-value indicating position.

The type wheel 14 for the next higher decimal position, in the present example the tenth of the unit to be weighed and indicated, is geared by means of the gear train 11, 12, 13 at the ratio 1:1 to a toothed disc 10, shown in detail in Fig. 3. This latter disc is free on arbor 3 but is coupled to disc 4 by means of a yielding coupling shown in detail in Fig. 3. For this purpose, a detent 8 is provided on disc 4, which is engaged by two levers 15 and 16, pivotally attached to disc 10, but eccentrically, at 15a. The two levers are held clamped against detent 8 by means of a spring 9. In addition, two stops 17 and 18 are provided on disc 10, stop 17 for lever 15 and stop 18 for lever 16. Thus, assuming for the moment that disc 4 is set in position by pawl 6 as aforedescribed, and a positioning pawl 19 in Fig. 3, by means of a strong spring power (not shown), should descend in the direction of the arrow onto wheel 10 and should encounter the side of one of its teeth, for instance the left-hand side of the left-hand tooth of the pair 10a, wheel 10 would be forced to rotate clockwise and thereby stop 17 would take along lever 15 and thus put spring 9 under further tension until pawl 19 has reached the bottom between the two adjoining teeth of wheel 10. The gearing between disc 10 and type wheel 14 as aforementioned is such that when the disc 10 has performed one revolution, type wheel 14 has also performed one revolution. Therefore, when positioning pawl 19 descends between two of the ten teeth of wheel 10, the corresponding tenth numeral value on wheel 14 is presented to the eye of the observer or into printing position. By this arrangement, the type wheel 14 is correctly positioned with respect to each of its ten numeral types, even if the toothed disc 4 should not have been quite correctly positioned in this respect by its positioning pawl 6. Now all three numeral wheels 14, 28a, 28 are in correct position in accordance with the load being weighed for reading (or printing) the final result down to the last-provided decimal value. After reading (or printing) the result, positioning pawl 19 is raised by its cam 19ᵃ and spring 9 pulls wheel 10 back into the normal position with respect to disc 4 (shown in Fig. 3) in which both levers 15 and 16 engage stop 8. If now the remaining positioning pawls 6 and 29 are raised, all type wheels can return to their no-value indicating positions.

In order to avoid erroneous printing in case the maximum load for which the scale is designed should be exceeded, or in case printing is attempted when there is no load on the scale, a so-called overload and no-load lock is provided for the type wheels. A lock is arranged for avoiding such errors in the smaller decimal digits, such as are on numeral wheels 28 and 28ᵃ, in the following manner. The tooth of disc 20, which would come into registry with pawl 29 at overload or at no load, is not provided with a point as the remaining teeth of disc 20, but is provided with an extensive peripheral portion such as is shown at 20ᵃ in Figs. 4ᵃ and 4ᶜ. When this tooth has moved into the path of positioning pawl 29 and this pawl should descend, it would be prevented from descending beyond the periphery of tooth 20ᵃ, and could therefore not move sub-unit setting pawl 21. Since the latter is normally held by spring 22 against fixed stop 23, and since thus the two type wheels 28, 28ᵃ are held in their zero position, no numerical value would be observed (or could be printed). In order to indicate that no value is to be indicated or printed in that position of the mechanism, this zero position of each type wheel may be provided with a particular character, for instance $x$ as shown in Fig. 2. Of course, when the mechanism is originally assembled, all the gears must be meshed so that the character $x$ appears when all gears are in no-value transmitting position.

A similar no-value indicating mechanism is provided for the type wheel 14. As will be noted from Fig. 3, one of the teeth of toothed disc 10 is split into two teeth 10ᵃ, 10ᵃ. The gearing to wheel 14 is meshed so that the mark $x$ on type wheel 14 is visible or in printing position when disc 10 is in a position in which it presents the interstitial space between the two teeth 10ᵃ, 10ᵃ to pawl 19. If this interstitial space should not be presented exactly in line with pawl 19, but should merely be within range of this pawl, disc 10 is moved slightly clockwise or counterclockwise as the case may be when pawl 19 descends, so that the numeral wheel 14 is moved in one or the other direction until the mark $x$ is correctly presented in observation or printing position.

Wheels 14, 28 and 28ᵃ, shown and described, are merely indicative of the manner in which type or numeral wheels may be adjusted. The manner in which the printing may actually occur forms no part of the present invention, and may be accomplished by any conventional mechanism. For instance, the type wheels 14, 28ᵃ and 28 may be disposed in the printing mechanism so that the entire result of the weighing is printed. They may be arranged, however, also so that only a part of the total weighing value adjusted by rack bar 1 is transmitted to the printing mechanism, while the balance, in particular the higher values such as the units or the tenths, may be observed by the operator directly on a dial in the conventional manner or may be transferred to another separate printing mechanism of a character similar to that shown in the drawing. If the result of the weighing is not to be printed, but merely visually observed, the same arrangement as shown may be used, but if necessary the numerals on the numeral wheels may be made more easily readable by conventional magnifying glasses such as are now frequently used in scales.

It is also possible to print the result of the weighing and to make it readable at the same time directly by means of magnification. It is also possible to transfer the indication made in the manner described to an adding mechanism by which the results of consecutive weighings may be added.

We claim:

1. In automatically indicating scales or the like, a numeral-setting mechanism comprising a numeral indicator for each digit of the value to be indicated, means actuated by the value-determining force of the scale for operating the numeral indicator for the higher decimal units to indicate the momentary value of said units, means for locking said operating means in said indicating position, a sub-unit setting element disposed to have freedom of movement relatively to said operating means within a subdecimal range of the movement of said operating means and geared to operate the lower decimal unit numeral indicators to present the subdecimal portions of the higher decimal unit value, and a separately operable positioning element, controlled by said operating means for actuating said setting element to exactly set the lower decimal unit indicators in the proper subdecimal position in accordance with the prevailing position of said operating means to indicate the lower decimal values in exact subdecimal relation to the values indicated by the higher decimal unit indicator.

2. In automatically indicating scales or the like, a numeral-setting mechanism comprising a numeral indicator for each digit of the value to be indicated, means actuated by the value-determining force of the scale for operating the numeral indicator for the higher decimal units to indicate approximately correctly the momentary value of said units, means for locking said operating means in said indicating position, a sub-unit setting element disposed to have freedom of movement relatively to said operating means within a subdecimal range of the movement of said operating means and geared to operate the lower decimal unit numeral indicators to present the subdecimal portions of the higher decimal unit value, a separately operable positioning element, controlled by said operating means for actuating said setting element to exactly set the lower decimal unit indicators in the proper subdecimal position in accordance with the prevailing position of said operating means to indicate the lower decimal values in exact subdecimal relation to the values indicated by the higher decimal unit indicator, a second setting element yieldingly coupled, within given limits, with said operating means and geared to the higher decimal unit indicator to adjust said indicator to present approximately the correct momentary values, said second element having a number of teeth equal to the number of values contained in the high decimal unit indicator, and a separately operable second positioning element disposed to engage between the teeth of said second setting element when the latter has been adjusted in the approximately correct indicating position by said operating means, to position said second setting element and the indicator operated by it to exactly indicate each value of the high decimal unit indicator.

3. In automatically indicating scales or the like, a numeral-setting mechanism comprising numeral wheels for the higher and the lower decimal place values to be indicated, a peripherally serrated wheel operated by the load being weighed on the scale and connected to the higher decimal wheel for adjusting the latter to present the proper numerical value of that decimal wheel according to the load being weighed, and means for locking said serrated wheel in said adjusting position, a toothed wheel coupled with said serrated wheel and having elongated teeth equal in number to the number of values contained on said higher decimal wheel, a sub-unit setting pawl rotatably mounted with respect to said toothed wheel and means for yieldingly holding said pawl in fixed neutral position, gearing between said pawl and the lower decimal unit numeral wheels to rotate the latter one revolution when said pawl moves from one tooth of said toothed wheel to the next, a positioning pawl movably disposed in the operating plane of said toothed wheel and of said setting pawl and outside means for operating said positioning pawl, so that the latter moves said setting pawl from neutral position an angular distance, varying with the prevailing position of the wheel teeth relatively to the neutral setting pawl position, until the positioning pawl engages a wheel tooth, whereby said lower decimal numeral wheels are rotated from their no-value indicating position to present the proper numerical values representing the exact subdecimal values of the value presented by said higher decimal wheel.

4. In automatically indicating scales or the like, a numeral-setting mechanism comprising numeral wheels for the higher and the lower decimal place values to be indicated, a peripherally serrated wheel operated by the load being weighed on the scale and connected to the higher decimal wheel for adjusting the latter to present the proper numerical value of that decimal wheel according to the load being weighed, means for locking said serrated wheel in said adjusting position, a toothed wheel coupled with said serrated wheel and having elongated teeth equal in number to the number of values contained on said higher decimal wheel, a sub-unit setting pawl rotatably mounted with respect to said toothed wheel and means for yieldingly holding said pawl in fixed neutral position, gearing between said pawl and the lower decimal place numeral wheels to rotate the latter one revolution when said pawl moves from one tooth of said toothed wheel to the next, a positioning pawl movably disposed in the operating plane of said toothed wheel and of said setting pawl and outside means for operating said positioning pawl, so that the latter moves said setting pawl from neutral position an angular distance, varying with the prevailing position of the wheel teeth relatively to the neutral setting pawl position, until the positioning pawl engages a wheel tooth, whereby said lower decimal numeral wheels are rotated from their no-value indicating position to present the proper numerical values representing the exact subdecimal values of the value presented by said higher decimal wheel, and means on the tooth of said toothed wheel representing the no-value indicating position of said higher decimal wheel for preventing said positioning pawl from moving said setting pawl from neutral position when said tooth is located in the path of said positioning pawl.

5. In automatically indicating scales or the like, a numeral-setting mechanism comprising a numeral indicator for each digit of the value to be indicated, means actuated by the value-determining force of the scale for operating the numeral indicator for the higher decimal units to indicate approximately correctly the momentary value of said units, means for locking said operating means in said indicating position, a sub-unit setting element disposed to have freedom of movement relatively to said operating means within a subdecimal range of the movement of said operating means and geared to operate the lower decimal unit numeral indicators to present the subdecimal portions of the higher decimal unit value, a separately operable positioning element, controlled by said operating means for actuating said setting element to exactly set the lower decimal place indicators in the proper subdecimal position in accordance with the prevailing position of said operating means to indicate the lower decimal values in exact subdecimal relation to the values indicated by the higher decimal unit indicator, a second setting element yieldingly coupled, within given limits, with said operating means and geared to the higher decimal unit indicator to adjust said indicator to present approximately the correct momentary values, said second element having a number of teeth equal to the number of values contained in the high decimal unit indicator, and a separately operable second positioning element disposed to engage between the teeth of said second setting element when the latter has been adjusted in the approximately correct indicating position by said operating means, to position said second setting element and the indicator operated by it to exactly indicate the indicated value of the high decimal unit indicator, the tooth of said second setting element, representing the no-value indicating position of the higher decimal unit indicator, being bifurcated at its tip, so that when said second positioning element engages said bifurcated tooth portion, the higher decimal unit indicator is exactly set into and locked in no-value indicating position.

CARL JOLAS.
WILLI STEIN.